United States Patent [19]
Holmberg

[11] Patent Number: 5,924,178
[45] Date of Patent: Jul. 20, 1999

[54] TIGHTENING DEVICE FOR SHOELACES AND LIKE ELONGATED AND PLIABLE ELEMENTS HAVING FREE ENDS

[75] Inventor: Johan Holmberg, Mora, Sweden

[73] Assignee: Lazylock AB, Mora, Sweden

[21] Appl. No.: 09/061,901

[22] Filed: Apr. 17, 1998

[51] Int. Cl.⁶ .............................. A43C 7/00; F16G 11/00
[52] U.S. Cl. ................... 24/712.5; 24/712.6; 24/115 G
[58] Field of Search ................ 24/712.5, 712.6, 24/712.7, 712, 713.6, 115 G, 136 L; 403/353

[56] References Cited

U.S. PATENT DOCUMENTS

| | | | |
|---|---|---|---|
| 399,027 | 3/1889 | Frank . | |
| 756,940 | 4/1904 | Conger | 24/712.7 |
| 2,524,649 | 10/1950 | Buhler | 287/75 |
| 3,057,029 | 10/1962 | Miller, Jr. et al. | 24/712.6 |
| 3,080,867 | 3/1963 | Eichinger | 128/346 |
| 4,288,891 | 9/1981 | Boden | 24/115 G |
| 4,336,636 | 6/1982 | Ishiguro et al. | 24/712.7 |
| 4,393,550 | 7/1983 | Yang et al. | 24/117 |
| 4,817,250 | 4/1989 | Kurosaki | 24/115 G |
| 4,881,302 | 11/1989 | Lee | 24/136 R |
| 5,224,245 | 7/1993 | Matoba | 24/115 G |
| 5,263,232 | 11/1993 | Matoba | 24/115 G |
| 5,293,675 | 3/1994 | Shai | 24/712.5 |
| 5,323,514 | 6/1994 | Masuda et al. | 24/115 G |
| 5,365,641 | 11/1994 | Watanabe et al. | 24/115 G |
| 5,477,593 | 12/1995 | Leick | 24/712.5 |
| 5,697,128 | 12/1997 | Peregrine | 24/115 G |

FOREIGN PATENT DOCUMENTS

| | | | |
|---|---|---|---|
| 0 314 628 | 5/1989 | European Pat. Off. . | |
| 0271364 | 1/1951 | Sweden | 24/712.6 |
| WO 96/21372 | 7/1996 | WIPO . | |

*Primary Examiner*—Victor N. Sakran
*Attorney, Agent, or Firm*—Jacobson, Price, Holman & Stern, PLLC

[57] ABSTRACT

A tightening device for shoelaces and other elongated pliable elements having free ends includes a casing and two slides mounted in said casing. Extending through the casing are two holes which are mutually spaced apart and disposed perpendicularly to the direction of slide movement and through which the free ends can be threaded. The slides are movable in the casing from a first position in which they each block a respective hole in the casing, to a second position in which they each expose their respective hole. The slides are also spring-biased towards said first position for securing an element inserted through the holes, in coaction with the casing. The holes penetrating the casing define a right angle with each other.

7 Claims, 3 Drawing Sheets

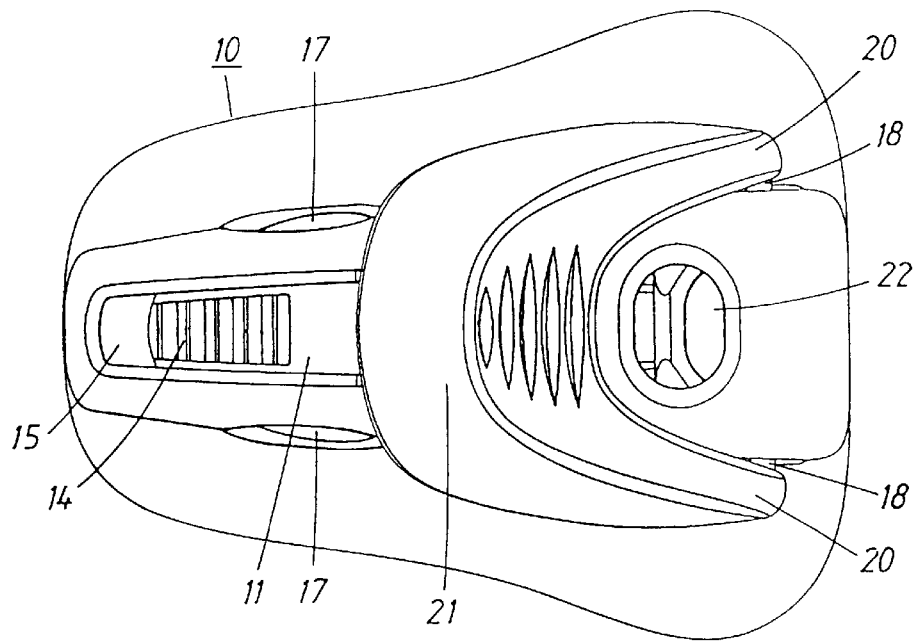
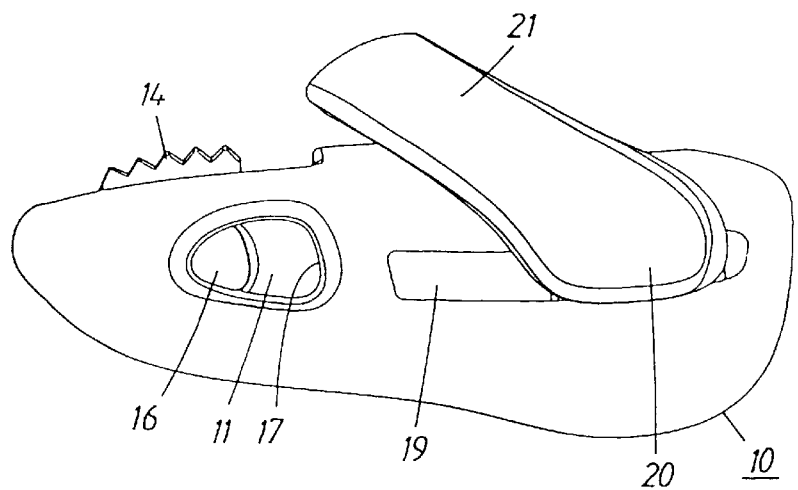

1

TIGHTENING DEVICE FOR SHOELACES AND LIKE ELONGATED AND PLIABLE ELEMENTS HAVING FREE ENDS

FIELD OF INVENTION

The present invention relates to a tightening device for shoelaces and like elongated and pliable elements having free ends.

BACKGROUND OF THE INVENTION

Tightening devices for shoelaces and other elongated elements are known, for instance, from U.S. Pat. Nos. 3,080,867, 4,288,891, 4,393,550, 4,817,250, 4,881,302, 5,224,245 and 5,263,232.

The object of the present invention is to provide a novel and improved tightening device that is particularly suited for securing shoelaces, although it is not restricted to this particular use.

SUMMARY OF THE INVENTION

In accordance with the invention, there is provided to this end a device for tightening shoelaces and other elongated and pliable elements having free ends that includes a casing and two slides displaceably mounted therein, wherein the casing includes two through-penetrating and mutually spaced holes that face perpendicular to the direction of movement of the slides and through which the free ends of said elements are intended to be passed, wherein the slides are movable in the casing from a first position in which they each block a respective hole in the casing, to a second position in which they each expose their respective hole, wherein the slides are spring-biased towards said first position for securing, in coaction with the casing, elongated elements inserted through said holes, and wherein the through-penetrating holes in said casing define a right angle with one another.

These and other characteristic features of an inventive tightening device will be apparent from the following Claims.

BRIEF DESCRIPTION OF THE DRAWINGS

The invention will now be described in more detail with reference to the accompanying drawings, in which FIG. 1 shows a tightening device from above;

FIG. 2 is a side view of the tightening device shown in FIG. 1;

DESCRIPTION OF PREFERRED EMBODIMENTS

Figure 3:
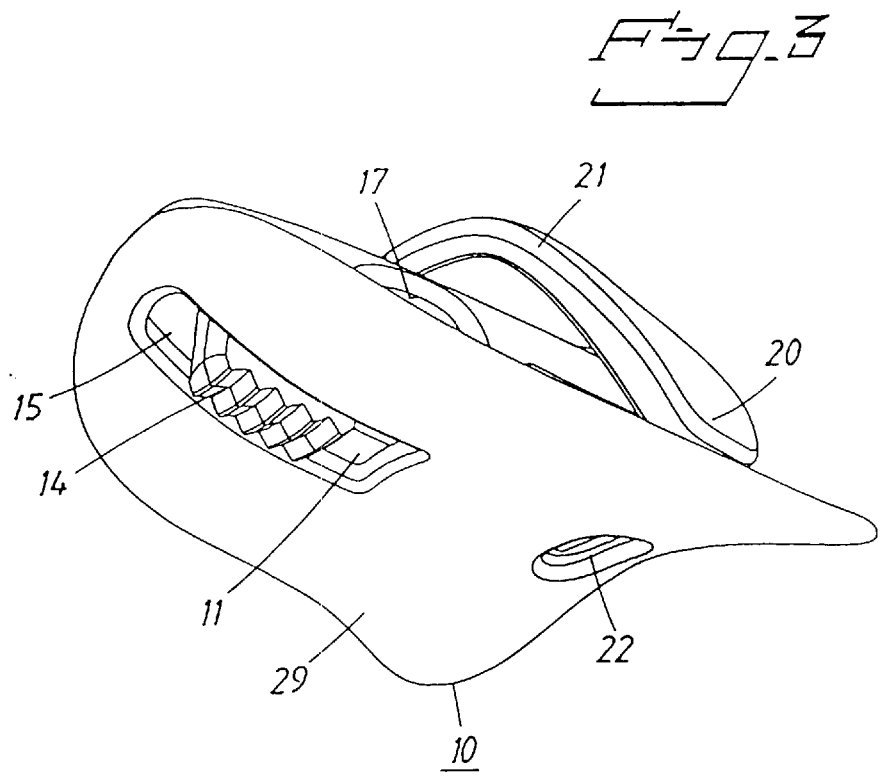
FIG. 3 is a perspective view of the tightening device shown in FIG. 1, seen obliquely from beneath.

The illustrated tightening device includes a casing generally designated 10 that houses a front slide 11 and a rear slide 12, said slides being mounted in the casing 10 for movement towards and away from each other. A thrust spring 13 acting between the slides 11, 12 strives to hold the front slide 11 in a forward position and the rear slide 12 in a rearward position, as evident from FIG. 4. The rear slide 12 can be moved to a forward position, shown in FIG. 5, against the action of the spring 13, while the front slide can be moved to a rearward position, shown in FIG. 6, against the action of said spring 13.

The front slide 11 includes parts 14 that project out through slots 15 in the top and bottom sides of the casing 10. These parts 14 enable the slide 11 to be operated manually from outside the casing. Thus, the slide 11 can be easily moved to the rear position shown in FIG. 6, in which an opening 16 in the slide coincides with a correspondingly shaped hole 17 that extends through the casing and that is formed by providing openings in two mutually opposing walls of the casing. When the slide 11 is in its rear position, the two ends of a shoelace for instance (not shown) can be inserted through the hole 17 and the opening 16, said shoelace being firmly clamped and held by the coaction between the slide and the casing when the slide 11 returns to its forward position.

Figure 4:
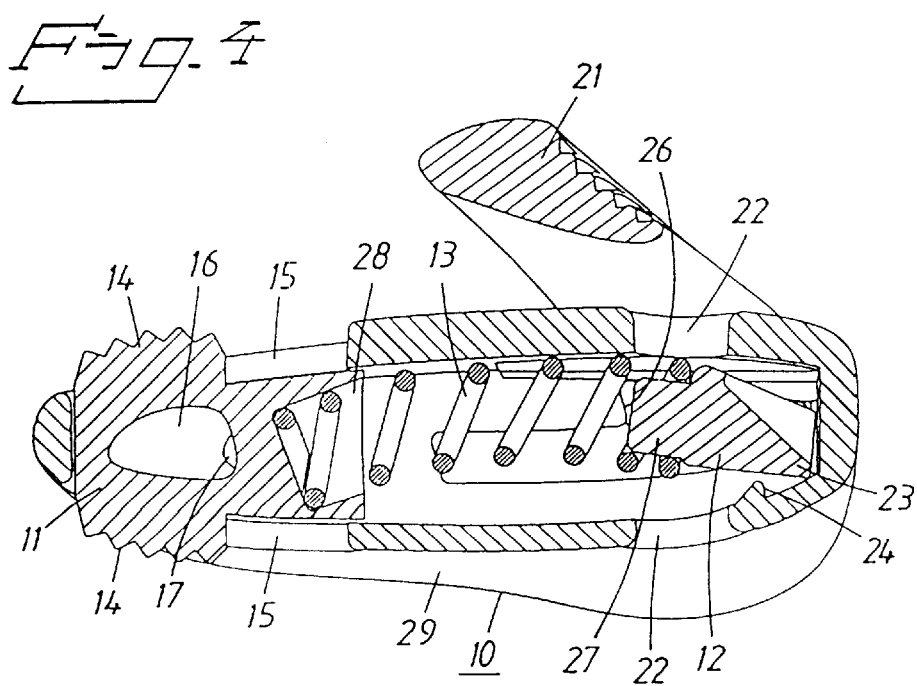
FIG. 4 is an axial sectioned view of the tightening device shown in FIG. 1.

The rear slide 12 is also provided with parts 18 that project out through and are guided in slots 19 provided the side-walls of the casing 10. These parts 18 are rigidly connected to the ends 20 of a generally U-shaped member 21 on the outside of the casing. The slide 12 can be moved from the rearward position shown in FIGS. 4 and 6 to the forward position shown in FIG. 5 against the action of the spring 13, by manually operating the U-shaped member 21, wherewith the slide 12 exposes a hole 22 that extends through the casing 10 and which is formed by openings provided in the top and bottom sides of the casing, these openings being mutually spaced from the hole 17 and defining a right angle therewith. When the slide 12 is in its forward position, the two ends of a shoelace for instance (not shown) can be inserted through the hole 22, said shoelace being clamped and secured by the coaction between slide and casing when the slide 12 returns to its rearward position. With the intention of increasing the holding strength of the device, particularly with respect to downward passage of the shoelace, as seen in FIGS. 4 and 6, the rear end of the slide 12 converges to form a relatively narrow, transverse edge 23, and a transverse rib 24 is provided on the inside of the casing 10 immediately behind the opening 22. The slots 19 in the rear part of the slide 12 widen upwardly at 25, so as to enable the slide 12 to pivot to a limited extent. This widening of the slots 19 provides shoulders 26 against which the slide 12 abuts in its upwardly swung position, shown in FIGS. 4 and 6, and is locked in the proximity of its rear position against movement towards its front position, until the slide is swung down with the aid of the U-shaped member 21 to a position in which said parts 18 are able to pass into the narrower, front parts of the slots 19.

The thrust spring 13 may be a coil spring whose one end embraces a pin 27 provided on the front end of the slide 12 and the other end of which is received in a blind hole 28 in the rear end of the slide 11. The hole 28 is inclined upwards and rearwards, so that the spring 13 will strive to twist the slide 12 anti-clockwise in FIGS. 4–6, thereby causing the slide 12 to automatically take the upwardly swung position shown in FIGS. 4 and 6 immediately it passes the shoulders 26 upon its return to its rear position.

As shown, the casing 10 has, beneficially, a flattened shape and the underside 29 is arched concave with respect to the direction of movement of the slides 11, 12, so as to conform more effectively with the underlying support surface, i.e. preferably the upper side of a shoe, and is slightly arched convexly as seen transversely to said movement direction.

Figure 5:
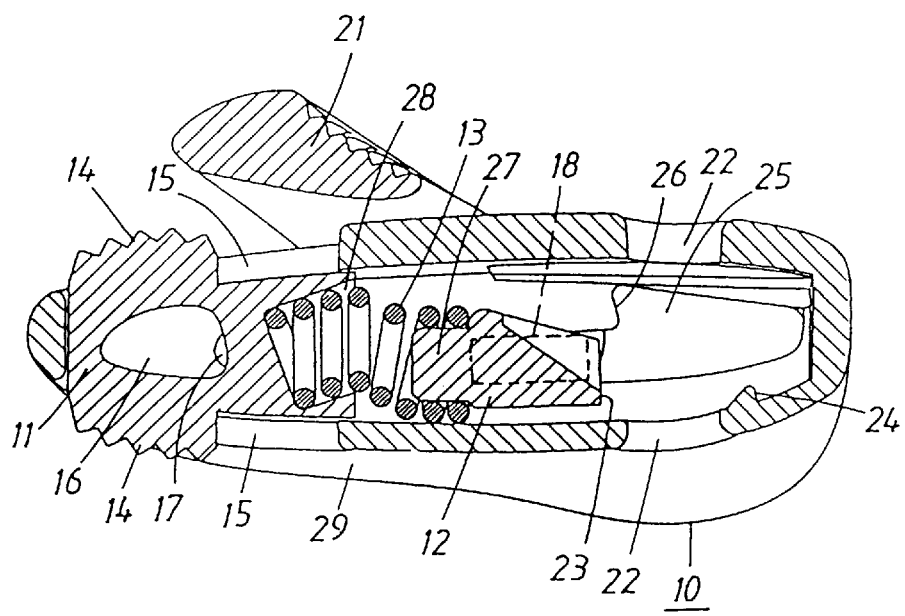
FIG. 5 is a view similar to FIG. 4 showing a rear slide displaced forwardly.
Figure 6:
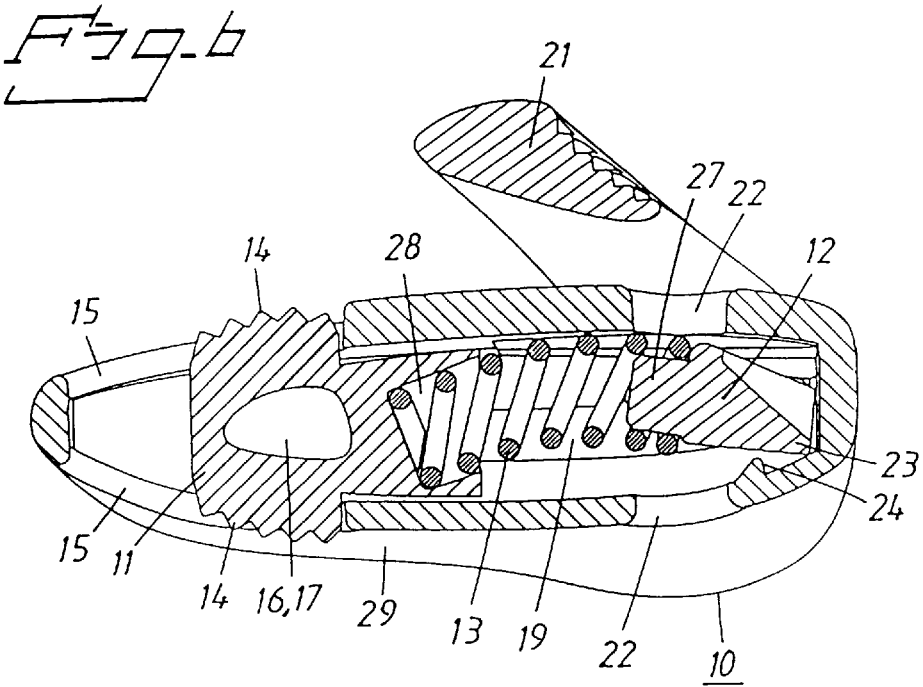
FIG. 6 is a view similar to FIG. 4 showing a front slide displaced rearwardly.

When using the tightening device with a lace-up shoe, for instance a trainer, the rear slide 12 is moved forwards to the position shown in FIG. 5 and the free ends of a lace are inserted through the hole 22 from beneath. The slide 12 is then allowed to return to its rear position under the action of the spring 13, and the front slide 11 is moved rearwards so as to bring the opening 16 and the hole 17 into register with one another, as shown in FIG. 6. The free ends of the lace are then threaded through the hole 17 and the opening 16, preferably from opposite directions, whereafter the slide 11 is allowed to return to its forward position while clamping the ends of the lace. The lace is now tightened, by pulling on the lace parts that extend up from the hole 22 towards opposite sides of the tightening device, wherewith the slide 12 moves resiliently forwards in the slots 19. The U-shaped member 21 is then pressed rearwardly and upwardly, causing the slide 12 to be locked against forward movement while firmly clamping the shoelace. The shoe is unlaced, by pressing the U-shaped member 21 downwards and lifting the entire tightening device upwards, wherewith the lace parts move down through the hole 22 so as to loosen the lace.

It will be understood that the invention is not restricted to the described and illustrated embodiments thereof and that modifications can be made within the scope of the following Claims.

I claim:

1. A tightening device for tightening shoelaces and like elongated and pliable elements having free ends, said device comprising a casing in which two movable slides are mounted, wherein the casing includes two mutually spaced through-penetrating holes disposed at right angles to the direction of movement of said slides and through which said free ends are intended to be passed; wherein the slides are movable in the casing from a first position in which the slides each block a respective hole in said casing, to a second position in which the slides each expose the respective hole; wherein the slides are spring-biased towards said first position for securing elements inserted into said holes, in coaction with said casing; at least one of the slides being movably guided in opposing slots that extend through the casing wall and including parts which project out through said slots and which can be actuated manually from outside the casing for movement of the slide towards said second position; said parts of said one slide that project out through two opposing slots being rigidly connected to ends of legs of a generally U-shaped member wherein the slide can be pivoted to a limited extent in a position in the proximity of said first position about an axis which extends perpendicularly to its movement direction by manual actuation of said U-shaped member to a locking position in which the slide is locked against further movement towards its said second position, by engagement with locking shoulders on the casing; and wherein the through-penetrating holes in said casing define a right angle with each other.

2. A tightening device according to claim 1, wherein the slides are spring-biased in a direction away from each other by means of a common thrust spring acting therebetween.

3. A tightening device according to claim 1, wherein one of the slides includes a through-penetrating opening which is adapted to coincide with one of said two casing holes when the slide is in its second position.

4. A tightening device according to claim 1, wherein the slide is spring-biased towards said locking position.

5. A tightening device according to claim 1, wherein the casing has a flattened shape; wherein one of said two holes penetrating the casing extends through the underside of said casing and an upper side opposite to said underside, whereas the second of said two holes extends through two mutually opposing casing side-walls.

6. A tightening device according to claim 5, wherein the underside of the casing is concavely arched in the direction of slide movement.

7. A tightening device according to claim 6, wherein the underside of the casing is slightly convexly arched transversely to the direction of slide movement.

* * * * *